…

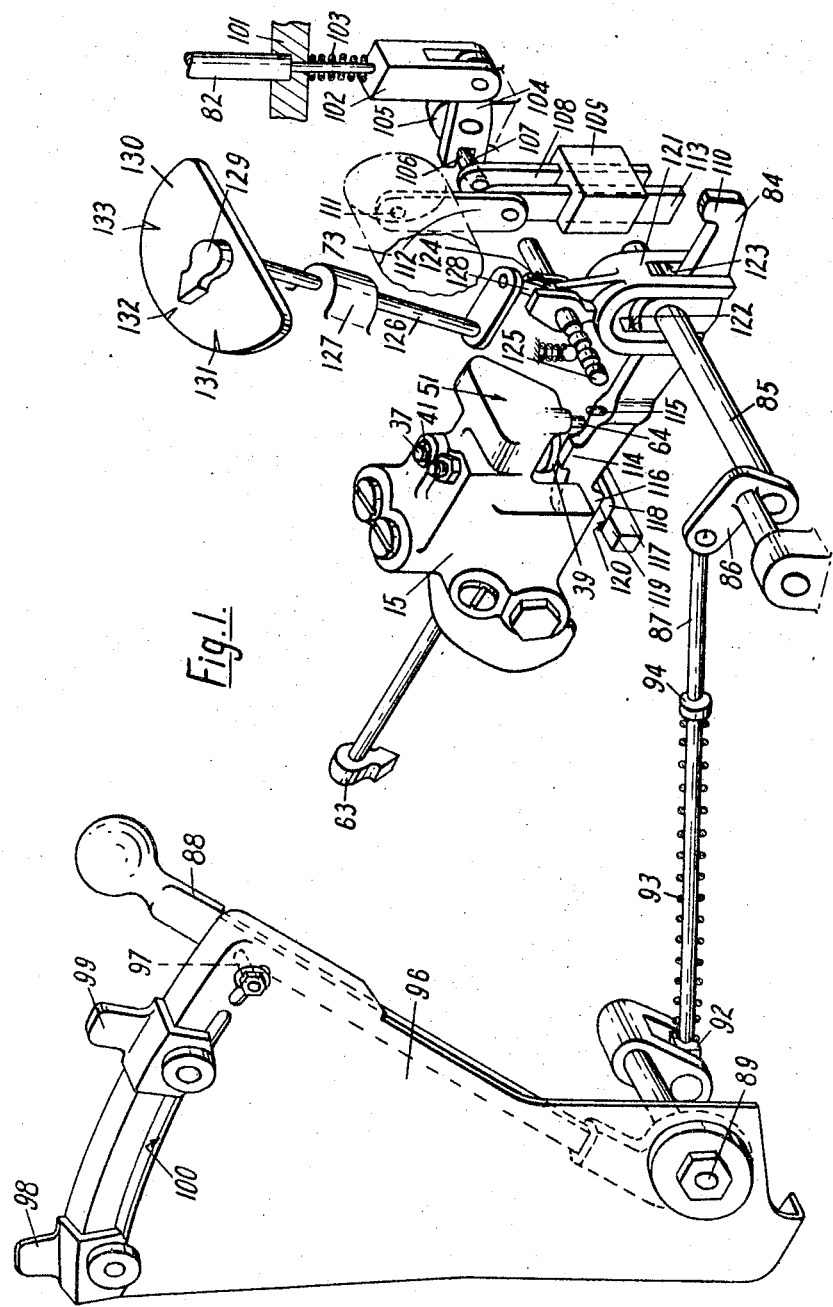

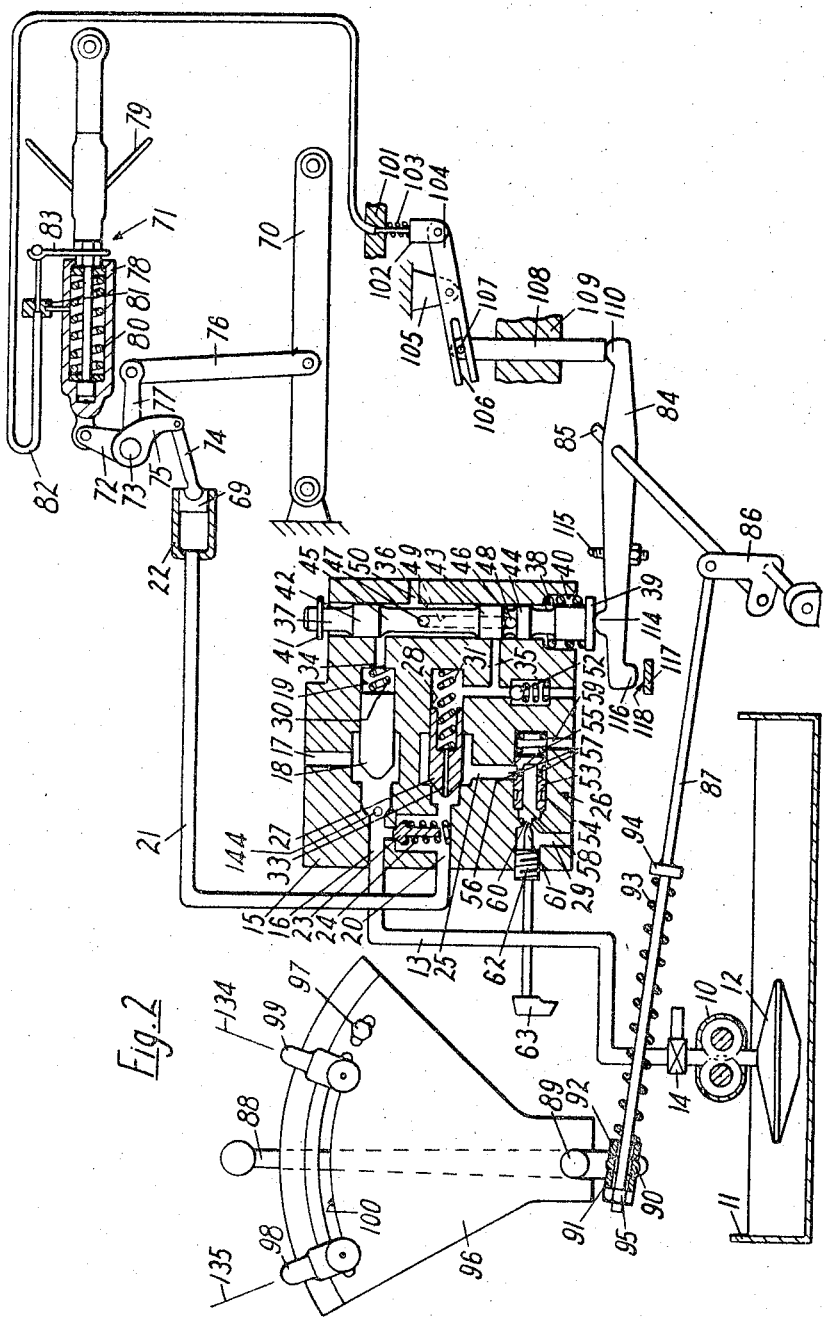

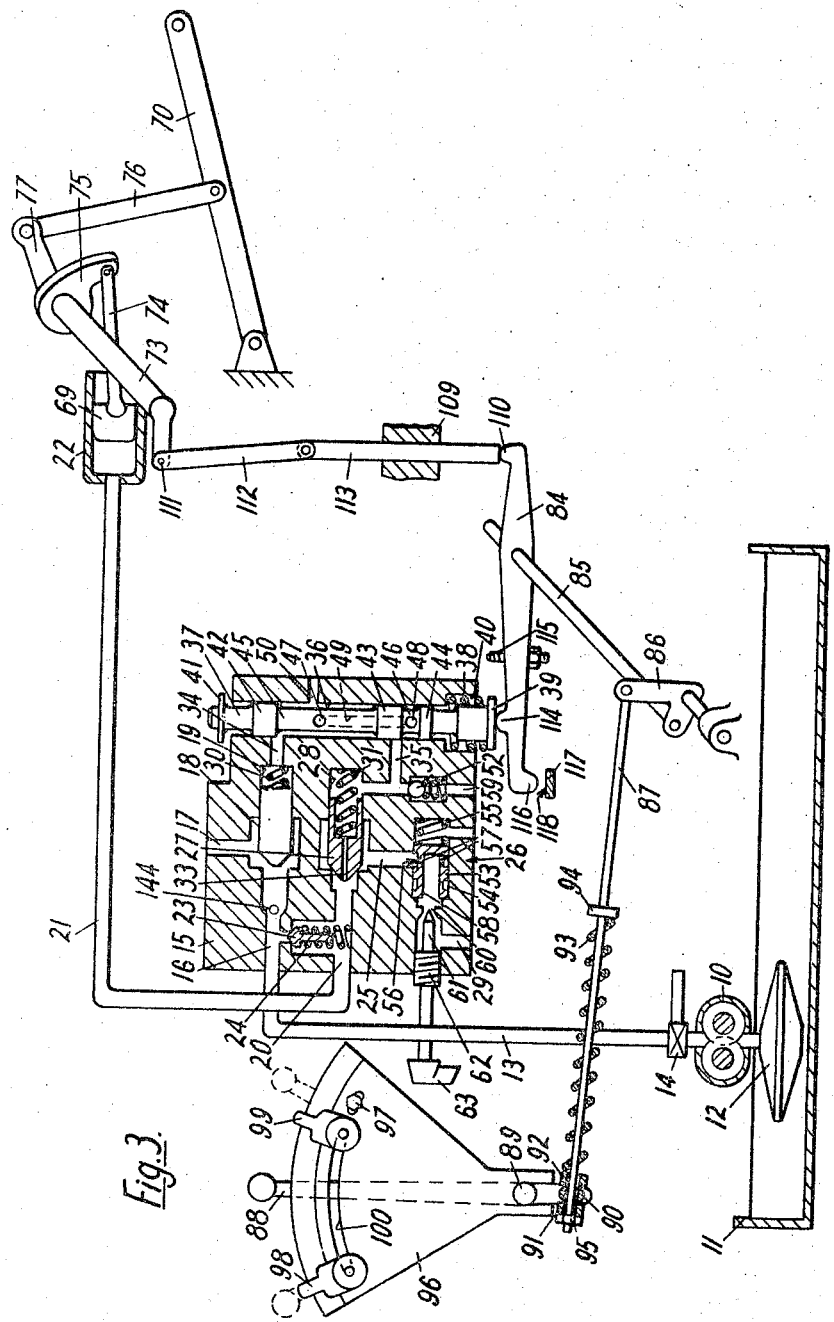

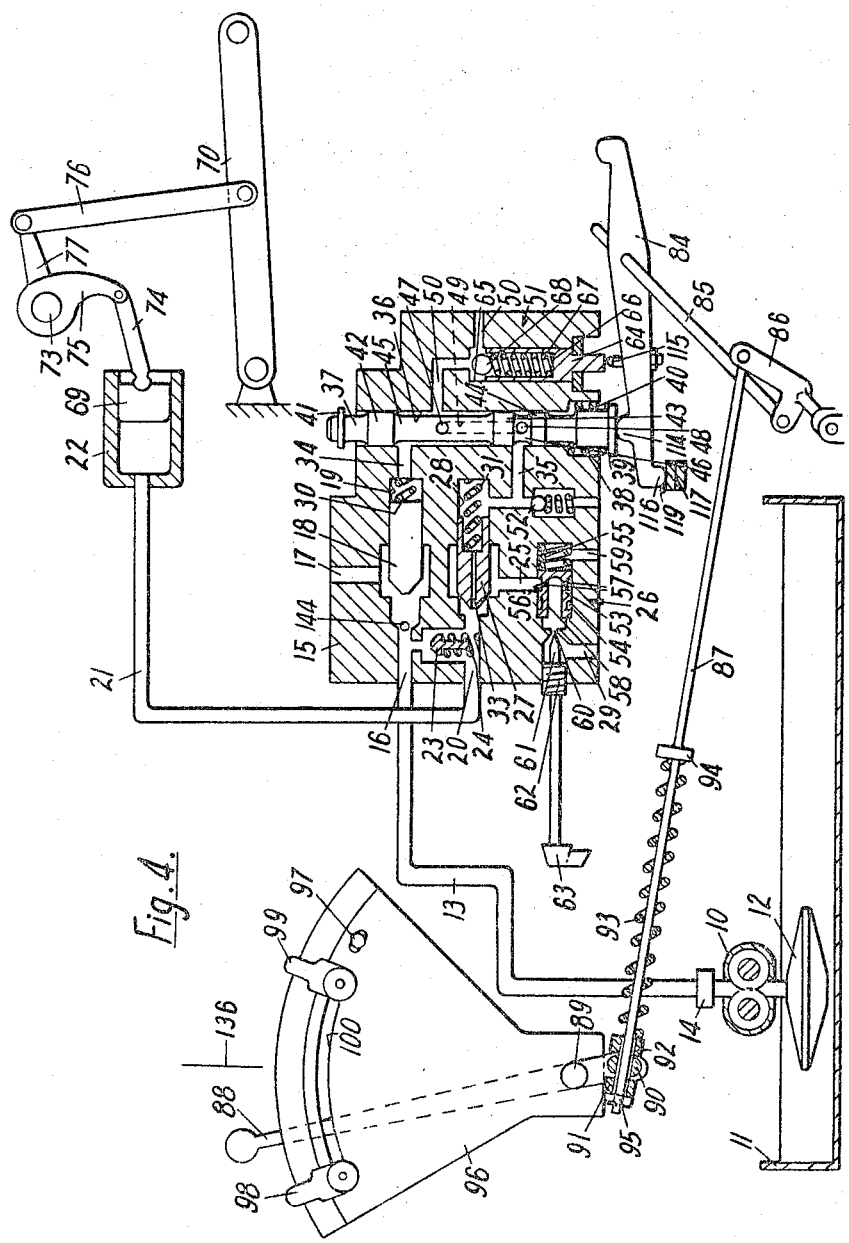

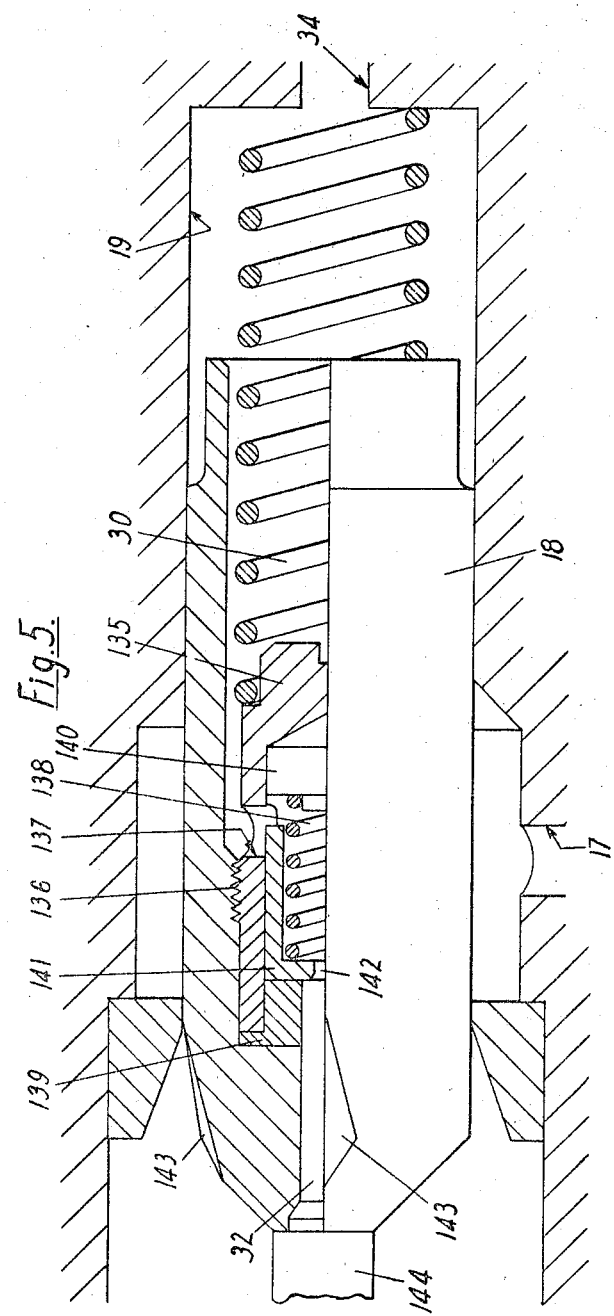

United States Patent Office 3,315,751
Patented Apr. 25, 1967

3,315,751
HYDRAULIC POWER LIFT MECHANISMS FOR AGRICULTURAL TRACTORS
Charles Hartley Hull and Harry Horsfall, Huddersfield, England, assignors to David Brown Tractors (Canada) Limited, Toronto, Ontario, Canada
Filed Jan. 31, 1964, Ser. No. 341,715
Claims priority, application Great Britain, Feb. 8, 1963, 5,203/63
13 Claims. (Cl. 172—9)

The invention relates to a hydraulic power lift mechanism for agricultural tractors or the like.

According to the invention, a hydraulic power lift mechanism, for an agricultural tractor or the like, comprises a pump, a hydraulic actuator, a control valve, and a control lever co-acting at all times with said valve and displaceable to co-act selectively with a member movable by variations in the height relative to the tractor or the like of an implement hitched thereto or with a member movable by variations in the draft force exerted by the tractor or the like on the implement, said control lever being pivotally connected to manual control means. Preferably, the control lever is also displaceable to co-act selectively with an abutment which is fixed relative to the tractor or the like. Preferably, also, when the control lever is displaced to co-act with said abutment it co-acts also with a relief valve and is adapted to cause said relief valve to maintain in the hydraulic power lift mechanism a pressure determinedly less than that required to raise the implement out of work.

A preferred embodiment of the invention will now be described, by way of example only, with reference to the accompanying drawings of which:

FIG. 1 is a semi-diagrammatic perspective view of control gear for a hydraulic power lift mechanism for an agricultural tractor;

FIG. 2 shows diagrammatically the mechanism arranged to effect draft control of an implement hitched to the tractor;

FIG. 3 shows diagrammatically the mechanism arranged to effect positional control of an implement hitched to the tractor;

FIG. 4 shows diagrammatically the mechanism arranged to effect controlled weight transfer to the tractor from an implement hitched thereto; and FIG. 5 is a part sectional view on a larger scale of one of the valves of the control gear.

Referring now to the drawings, a gear pump 10 driven directly by the tractor engine draws oil from a sump 11 through a filter 12 and delivers it through a conduit 13 containing a spring-closed relief valve 14 to a valve block 15. Said valve block contains a passage 16 communicating with the conduit 13, a passage 17 communicating with the passage 16 and leading to the sump 11, a composite valve 18 slidable in a bore 19 and adapted when closed to prevent oil flowing from the passage 16 into the passage 17, a passage 20 communicating with the passage 16 and with a conduit 21 leading to the cylinder 22 of a single-acting hydraulic jack, a non-return valve 23 adapted to prevent oil flowing from the passage 20 into the passage 16 and provided with a helical compression spring 24 so as to allow oil to flow from the passage 16 into the passage 20 only when the pressure of said oil exceeds a predetermined value, a passage 25 communicating with the passage 20 and leading to flow control means indicated generally at 26, a poppet valve 27 slidable in a bore 28 and adapted when closed to prevent oil flowing from the passage 20 into the passage 25, and a passage 29 leading from the flow control means to the sump 11. The valves 18 and 27 are urged towards their closed positions by respective helical compression springs 30 and 31, and are provided with rspective axial bleed holes 32 and 33 to enable oil to flow at a restricted rate from the passages 16 and 20 into the respective bores 19 and 28. The composite valve 18 is also provided with four axial grooves 143. A flow control valve, see FIG. 5, comprises a casing 135 provided with a threaded portion 136, two diametrically opposed radial ports 137, a helical compression spring 138, an annular sealing member 139, a spring locating member 140 and a slidable member 141 provided with an orifice 142. The flow control valve is mounted co-axially within the valve 18 and controls the rate of flow of oil through the bleed hole 32 to the bore 19 by movement of the slidable member 141 against the action of the spring 138 to regulate the flow through the port 137. A stop 144 is provided to limit the movement of the valve 18 in the closing direction. The bores 19 and 28 communicate by way of respective ports 34 and 35 with a bore 36 containing a slide valve 37. A helical compression spring 38 is located between a flange 39 at one end of the slide valve 37 and the inner end of a counterbore 40, and acts to urge the slide valve towards a position in which a collar 41 at its other end abuts against the valve block 15. The slide valve 37 is provided with three lands 42, 43 and 44 between which there are portions 45 and 46 of reduced diameter. Said portions communicate with one another by way of radial holes 47 and 48 and an axial hole 49 formed in the slide valve. A passage 50 communicates with the bore 36 and leads to the sump 11, and a relief valve indicated generally at 51 (see FIG. 4) is interposed in said passage. The port 35 contains a spring-closed relief valve 52. The flow control means 26 comprise a valve member 53 slidable in a bore 54. Said valve member is urged towards one end of the bore 54 by a helical compression spring 55, and an annular groove 56 in its periphery is connected by radial holes 57 to an axial hole 58 which opens into the bore 54 at the end of the valve member remote from the spring 55. A vent hole 59 connects that end of the bore 54 containing the spring 55 to the exterior of the valve block 15. That end of the bore 54 remote from the spring 55 communicates with the passage 29 by way of an orifice 60 capable of being adjustably restricted by a needle 61 carried by a screwed plug 62 to which there is secured an adjusting knob 63. The relief valve 51 comprises a member 64 slidable in a bore 65. One end of the member 64 projects from the valve block 15, and in its other end there is formed an axial hole 66 housing a helical compression spring 67 which acts to urge a ball 68 in a direction to blank off the passage 50 and thus to prevent the escape of oil to the sump 11 from the bore 36. The force of the spring 67, and thus the pressure required to open the relief valve 51, is variable by moving the member 64 in the bore 65 as hereinafter described.

The hydraulic cylinder 22 contains a ram 69 movement of which in said cylinder is adapted to cause lifting or lowering of an implement (not shown) connected to the tractor by a three-link hitch. Said hitch comprises two laterally spaced lower links 70 universally connected at their front ends to the tractor and a draft sensitive upper link indicated generally at 71 universally connected at its front end between two arms 72 rigidly secured on a rockshaft 73. Said rockshaft is movable angularly about its axis in response to movements of the ram 69 transmitted by a connecting rod 74 and an arm 75 rigidly secured on the rockshaft, and the lower links 70 are connected pivotally, by means of respective lift rods 76, to two laterally spaced lift arms 77 rigidly secured on the rockshaft. The link 71 comprises two mutually telescopic portions 78 and 79 between which a helical compression spring 80 is confined in such manner that it resists both lengthening and shortening of the link 71. The portion 78 carries an abutment 81 for the case of a Bowden cable 82, and the portion 79 carries an anchorage 83 for the wire of said cable.

The hydraulic power lift mechanism is controlled by linkage means which govern selectively the position of the slide valve 37 or the position of both said slide valve and the member 64 of the relief valve 51. Said linkage means comprise a balance lever 84 which is pivotable and axially slidable on a shaft 85 carried by one arm of a bell crank lever 86 pivotally mounted on the tractor. The other arm of the bell crank lever is pivotally connected to one end of a rod 87. A hand lever 88 is pivotally mounted on the tractor about an axis 89 and is provided at its lower end with a pin 90 which is rotatable relative to the lever 88 about an axis parallel to the axis 89. The rod 87 passes slidably through a diametrical hole in the pin 90, and washers 91 and 92 are disposed on the rod 87 at opposite sides of said pin. A helical compression spring 93 is confined between the washer 92 and a collar 94 rigidly secured on the rod 87, and the end of said rod remote from the bell crank lever 86 is screwed and carries a nut 95 against which the washer 91 abuts. A quadrant 96 is secured to the tractor in association with the hand lever 88, and carries a fixed stop 97 and two pointers 98 and 99 which are adjustable along an arcuate slot 100 formed in the quadrant.

A fixed abutment 101 is provided for the case of the Bowden cable 82 at its end remote from the upper hitch link 71, and the wire of said cable is connected to a member 102. A light helical compression spring 103 is confined between the member 102 and the fixed abutment 101. The member 102 is pivotally connected to one end of a lever 104 which is pivotally mounted intermediate its ends on a lug 105 secured to the tractor. A slot 106 formed in the other end of the lever 104 is engaged by a pin 107 secured to one end of a plunger 108 which is slidable in a fixed guide 109. A projection 110 at that end of the balance lever 84 remote from the valve block 15 can be caused to co-act with the other end of the plunger 108, as hereinafter described.

Secured eccentrically on the rockshaft 73 is a pin 111 which is pivotally connected to one end of a link 112. The other end of said link is pivotally connected to one end of a plunger 113 which is slidable in the guide 109. The projection 110 can be caused to co-act with the other end of the plunger 113 as hereinafter described.

The balance lever 84 is provided also with a projection 114 adapted to co-act at all times with the slide valve 37; a projection 115 which can be caused to co-act with that end of the member 64 which projects from the valve block 15; and a projection 116 adapted to co-act at all times with a fixed abutment block 117. The upper surface of said block comprises a lower level portion 118 and a higher level portion 119 connected by a ramp portion 120, as shown in FIG. 1. The arrangement is such that the projection 116 is only caused to co-act with the higher level portion 119 of the abutment block 117 when the projection 115 is caused to co-act with the member 64.

Means are provided for sliding the balance lever 84 axially along the shaft 85 without hindering pivoting of the balance lever on said shaft. Said means are shown in FIG. 1 and comprise a fork 121 having slots 122 and 123 in its forked ends and a slot 124 in its other end. The fork 121 is secured on an axially slidable shaft 125 and the slots 122 and 123 engage the balance lever 84 at opposite sides of the shaft 85. A shaft 126 rotatably mounted in a fixed bearing 127 carries at one of its ends a crank pin 128 which engages in the slot 124 and at its other end a combined hand lever and pointer 129. A dial 130 is secured to the tractor in association with the pointer 129, and three positions 131, 132 and 133 are marked on said dial.

The operation of the hydraulic power lift mechanism is as follows (references to left hand, right hand, upward, downward, clockwise and anti-clockwise relate to the mechanism as viewed in the drawings):

When it is desired to select either draft control, positional control or controlled weight transfer, the hand lever 88 is moved to the position shown in FIG. 1 by bending it within its elastic limit so as to enable it to pass from the left hand side to the right hand side of the stop 97. This causes the balance lever 84 to move downwardly to a position in which the projection 116 contacts the fixed abutment block 117, the projection 110 is below the level of the lower ends of the plungers 108 and 113, the projection 114 is below the level of the lower end of the slide valve 37, and the projection 115 is below the level of the lower end of the member 64, as shown in FIG. 1. The combined hand lever and pointer 129 is then turned to the required one of the positions 131, 132 and 133 marked on the dial 130. If the position 131 is selected, the crank pin 128 causes the fork 121 to move the balance lever 84 axially along the shaft 85 until the projection 110 is aligned with both of the plungers 108 and 113. The projection 114 is aligned with the slide valve 37 but the projection 115 is not aligned with the member 64 of the relief valve 51. The balance lever 84 is then positioned axially to vary automatically the working depth of an implement hitched to the tractor in response to variations in the draft force exerted by the tractor on the implement. If the position 132 is selected, the balance lever 84 is moved axially along the shaft 85 until the projection 110 is aligned with the plunger 113 but not with the plunger 108. The projection 114 is aligned with the slide valve 37 but the projection 115 is not aligned with the member 64. The balance lever 84 is then positioned axially to correct automatically any variation in the height relative to the tractor of an implement hitched thereto, that is to say to effect positional control of said implement. If the position 133 is selected, the balance lever 84 is moved axially along the shaft 85 until the projection 110 is not aligned with either of the plungers 108 and 113. The projection 114 is aligned with the slide valve 37 and the projection 115 is aligned with the member 64. During the axial movement of the balance lever 84 the projection 116 rides up the ramp portion 120 of the abutment block 117 into contact with the higher level portion 119. The balance lever 84 is then positioned axially to effect controlled transference of weight to the tractor from an implement hitched thereto. When the required one of the positions 131, 132 and 133 has been selected, the hand lever 88 is moved back to the immediate left hand side of the stop 97. This raises the balance lever 84 to a position in which the projections 110, 114 and 115 contact the members, if any, with which they have respectively been aligned. An exception to this occurs when the position 131 has been selected as the projection 110 does not contact the plunger 108 at this stage since the lower end of said plunger is at a higher level than the lower end of the plunger 113. When either of the positions 131 and 132 has been selected, the projection 116 is raised out of contact with the abutment block 117 when the hand lever 88 is moved back to the left hand side of the stop 97, but when the position 133 has been selected and the hand lever 88 is so moved, the projection 116 remains in contact with the higher level portion 119 of the abutment block. While the hand lever 88 is positioned on the right hand side of the stop 97, the spring 38 holds the slide valve 37 in such a position that the lands 42 and 43 blank off the ports 34 and 35. As a result both of the valves 18 and 27 are hydraulically balanced and are thus held closed by their respective springs 30 and 31, and oil delivered by the pump 10 escapes to the sump 11 by way of the relief valve 14. The implement is therefore locked hydraulically in its fully raised position.

Referring now to FIGS. 2 and 3, whatever the position of the hand lever 88 on the left hand side of the stop 97 when draft or positional control has been selected, the slide valve 37 can occupy an equilibrium position as shown in said figures, can be moved upwardly from said position by the balance lever or downwardly from said position by the spring 38, and can be returned automatically to said position by a servo action. When the slide valve 37 occupies its equilibrium position, the land 43 blanks off the port 35 but the land 42 does not blank off the port 34. Thus oil contained in the bore 19 can escape to the sump 11 by way of the port 34, the space surrounding the portion 45 of reduced diameter and the passage 50, so that the valve 18 is unbalanced hydraulically and is caused to open. The oil can flow freely through the passage 50 when draft or positional control has been selected as the relief valve 51 is always inoperative due to its member 64 not being aligned with the projection 115, and the relief valve 51 is accordingly not shown in FIGS. 2 and 3 so as to simplify the understanding of the invention. The poppet valve 27 is, however, balanced hydraulically and is therefore held closed by its spring 31. Oil delivered by the pump 10 to the passage 16 can escape to the sump 11 via the passage 17, and oil contained in the cylinder 22 is locked there by the non-return valve 23. If the slide valve 37 is moved upwardly from its equilibrium position by the balance lever 84, its lands 42 and 43 do not blank off either of the ports 34 and 35. Thus oil contained in the bore 19 can continue to escape to the sump 11 by way of the port 34, the space surrounding the portion 45 of reduced diameter and the passage 50, and oil contained in the bore 28 can escape to the sump 11 by way of the port 35, the space surrounding the portion 46 of reduced diameter, the radial hole 48, the axial hole 49, the radial hole 47, the space surrounding the portion 45 of reduced diameter and the passage 50. Both of the valves 18 and 27 are therefore unbalanced hydraulically and the valve 27 is caused to open, the valve 18 being already open. Oil delivered by the pump 10 to the passage 16 can continue to escape to the sump 11 via the passage 17, and oil contained in the cylinder 22 can escape to the sump by way of the passage 25, the flow control means 26 and the passage 29. Thus the implement commences to be lowered and this eventually causes the slide valve 37 to be returned automatically to its equilibrium position by a servo action as hereinafter described. If the slide valve 37 is allowed to be moved downwardly from its equilibrium position by the spring 38, the lands 42 and 43 blank off the ports 34 and 35. Thus both of the valves 18 and 27 are balanced hydraulically and the valve 18 is caused to close by its spring 30, the valve 27 being already closed. When the valve 18 is closing, the varying cross-sectional area of the grooves 143 causes the flow to be throttled gradually so that the pressure increases at a predetermined rate. Oil delivered by the pump 10 to the passage 16 opens the non-return valve 23 and flows through the passage 20 and the conduit 21 into the cylinder 22. Thus the implement commences to be raised and this eventually causes the slide valve 37 to be returned automatically to its equilibrium position by a servo action as hereinafter described.

When positional control has been selected, the slide valve 37 can be moved upwardly from its equilibrium position (see FIG. 3) by moving the hand lever 88 in an anti-clockwise direction about the axis 89, as a result of which the balance lever 84 is caused to pivot in a clockwise direction about the point of contact between the projection 110 and the plunger 113. The slide valve is subsequently moved automatically downwards to its equilibrium position by a servo action involving anti-clockwise movement of the balance lever 84 about the shaft 85 permitted by upward movement of the plunger 113 due to clockwise movement of the rockshaft 73 on lowering the implement. The slide valve 37 can be moved downwardly from its equilibrium position either by moving the hand lever 88 in a clockwise direction about the axis 89, as a result of which the balance lever 84 is permitted to pivot in an anti-clockwise direction about the point of contact between the projection 110 and the plunger 113, or by the balance lever being permitted to pivot in an anti-clockwise direction about the shaft 85 due to automatic upward movement of the plunger 113 caused by clockwise movement of the rockshaft 73 as a result of the height of the implement relative to the tractor decreasing owing to seepage of oil from the cylinder 22. The slide valve is subsequently moved automatically upwards to its equilibrium position by a servo action involving a clockwise movement of the balance lever 84 about the shaft 85 caused by downward movement of the plunger 113 due to anti-clockwise movement of the rockshaft 73 on raising the implement. Thus positional control is effected over the full range of movement of the control lever 88 on the left hand side of the stop 97, that is to say the implement can be held by the hydraulic power lift mechanism at any desired height relative to the tractor, either above or below ground level.

When draft control has been selected and the hand lever 88 is positioned at the immediate left hand side of the stop 97, the relative vertical positions of the plungers 108 and 113 is such that movement of the hand lever between the stop 97 and a position 134 shown in FIG. 2 effects positional control of an implement hitched to the tractor as only the plunger 113 contacts the projection 110 although the plunger 108 is also aligned with the balance lever 84. The arrangement of the hydraulic power lift mechanism is such that when the hand lever 88 is in the position 134, the implement is approximately at ground level. Movement of the hand lever 88 between the position 134 and a position 135 shown in FIG. 2 effects draft control of the implement when the latter is in work below ground level. The slide valve 37 can be moved upwardly from its equilibrium position (see FIG. 2) either by moving the hand lever 88 in an anti-clockwise direction about the axis 89, as a result of which the balance lever 84 is caused to pivot in a clockwise direction about the point of contact between the projection 110 and the plunger 108 and/or the plunger 113, or, when the implement is in work, by the balance lever being pivoted in a clockwise direction about the shaft 85 due to automatic downward movement of the plunger 108 caused by lengthening of the upper hitch link 71 as a result of a decrease in the draft force exerted by the tractor on the implement. The slide valve 37 is subsequently moved automatically downwards to its equilibrium position by a servo action involving anti-clockwise movement of the balance lever 84 about the shaft 85 permitted either by upward movement of the plunger 108 due to shortening of the upper hitch link 71 as a result of an increase in draft force or by upward movement of the plunger 113 due to clockwise movement of the rockshaft 73 on lowering the implement. The slide valve 37 can be moved downwardly from its equilibrium position either by moving the hand lever 88 in a clockwise direction about the axis 89, as a result of which the balance lever 84 is permitted to pivot in an anti-clockwise direction about the point of contact between the projection 110 and the plunger 108 and/or the plunger 113, or, when the implement is in work, by the balance lever being permitted to pivot in an anti-clockwise direction about the shaft 85 due to automatic upward movement of the plunger 108 caused by shortening of the upper hitch link 71 as a result of an increase in draft force, or, when the implement is above ground level, by the balance lever being permitted to pivot in an anti-clockwise direction about the shaft 85 due to automatic upward movement of the plunger 113 caused by clockwise movement of the rockshaft 73 as a result of the height of the implement relative to the tractor decreasing owing to seepage of oil from the cylinder 22. The slide valve 37 is subsequently moved automatically upwards to its equilibrium position by a servo action involving clockwise movement of the balance lever 84 about the shaft 85 caused either by downward movement of the plunger 108 due to lengthening of the upper hitch link 71 as a result of a decrease in draft force or by downward movement of the plunger 113 due to anti-clockwise movement of the rockshaft 73 on raising the implement.

When controlled weight transfer to the tractor from an implement hitched thereto has been selected, the hydraulic power lift mechanism is controlled solely by the hand lever 88 and is not subjected to any automatic servo action. Referring now to FIG. 4, when it is desired to raise the implement to its transport position, the hand level 88 is moved to the immediate left hand side of the stop 97 as a result of which the balance lever 84 is caused to pivot in a clockwise direction about the point of contact between the projection 116 and the higher level portion 119 of the abutment block 117. Thus the slide valve 37 is permitted to move downwardly under the action of its spring 38 to a position in which the lands 42 and 43 blank off the ports 34 and 35. Both of the valves 18 and 27 are therefore balanced hydraulically and are closed. Oil delivered by the pump 10 to the passage 16 opens the non-return valve 23 and flows through the passage 20 and the conduit 21 into the cylinder 22 to raise the implement. When the implement has been fully raised, oil delivered by the pump 10 commences to escape to the sump 11 by way of the relief valve 14. Discharge of oil through said relief valve for any appreciable time would result in overheating and aeration of the oil, and to avoid this the hand lever 88 is moved by the operator to a "hold" position as soon as the implement has been fully raised. Whenever controlled weight transfer is selected, the pointer 99 is adjusted along the slot 100 so as to indicate the "hold" position. When the hand lever 88 is moved to said position, the balance level 84 is caused to pivot in an anti-clockwise direction about the point of contact between the projection 116 and the higher level portion 119 of the abutment block 117. This moves the slide valve 37 upwardly to a position in which the land 43 blanks off the port 35 but the land 42 does not blank off the port 34. Thus oil contained in the bore 19 can escape to the sump 11 by way of the port 34, the space surrounding the portion 45 of reduced diameter and the passage 50, so that the valve 18 is unbalanced hydraulically and is caused to open. The poppet valve 27 is, however, balanced hydraulically and is therefore held closed by its spring 31. Oil delivered by the pump 10 to the passage 16 can escape to the sump 11 via the passage 17, and oil contained in the cylinder 22 is locked there by the non-return valve 23. If the hand lever 88 is moved from the "hold" position towards a position 136 shown in FIG. 4, further anti-clockwise movement of the balance lever 84 about the point of contact between the projection 116 and the abutment block 117 moves the slide valve 37 upwardly so that the lands 42 and 43 do not blank off either of the ports 34 and 35. Thus oil contained in the bore 19 can continue to escape to the sump 11 by way of the port 34, the space surrounding the portion 45 of reduced diameter and the passage 50, and oil contained in the bore 28 can escape to the sump 11 by way of the port 35, the space surrounding the portion 46 of reduced diameter, the radial hole 48, the axial hole 49, the radial hole 47, the space surrounding the portion 45 of reduced diameter and the passage 50. Both of the valves 18 and 27 are therefore unbalanced hydraulically and the valve 27 is caused to open, the valve 18 being already open. Oil delivered by the pump 10 to the passage 16 can continue to escape to the sump 11 via the passage 17, and oil contained in the cylinder 22 can escape to the sump by way of the passage 25, the flow control means 26 and the passage 29. Whilst the control lever 88 is positioned between the stop 97 and the position 136, oil can flow freely through the passage 50 when controlled weight transfer has been selected as the relief valve 51 is inoperative due to the projection 115 being below the level of the lower end of the member 64. If, however, the hand lever 88 is moved to the left of the position 136, the ports 34 and 35 continue to communicate with the passage 50 but the projection 115 contacts the lower end of the member 64 and moves said member upwardly so as to increase the force of the spring 67 acting on the ball 68 and thus to make the relief valve 51 operative. The hydraulic power lift mechanism is illustrated in this condition in FIG. 4. The further the hand lever 88 is moved to the left of the position 136, the greater the force of the spring 67. Thus, although the ports 34 and 35 are not blanked off by the lands 42 and 43, the relief valve 51 maintains a predeterminedly variable back pressure within the hydraulic power lift mechanism. A force less than that required to raise the implement from its working depth can therefore be exerted on the implement, and a controlled proportion of the weight of the implement is accordingly transferred to the tractor. This assists in adhesion between the tractor driving wheels and the ground, and obviates or reduces wheel spin in difficult conditions, for instance when the soil is wet or loose.

The position 133 is normally selected also when the hydraulic power lift mechanism is required to actuate so-called "external" implements, that is to say implements which are not mounted on the hitch links 70 and 71 such as hydraulically tipped trailers and front mounted loaders.

It will, of course, be realised that when either draft control or positional control has been selected the working depth of an implement hitched to the tractor is controlled solely by the hydraulic power lift mechanism without the need for any depth-regulating means on the implement. When, however, controlled weight transfer has been selected, an implement provided with depth-regulating means such as a wheel or skid must be employed.

The spring 93 and the slidability of the rod 87 through the pin 90 carried by the hand lever 88 enable the hand lever to be moved in an anti-clockwise direction about the axis 89 at a speed too rapid to be accommodated immediately by the hydraulic power lift mechanism. If the lever is so moved, the spring 93 is compressed and thereafter drives the bell crank lever 88 in an anti-clockwise direction at a rate which can be accommodated by the hydraulic power lift mechanism until the pin 90 once again abuts against the washer 91 which in turn abuts against the nut 95.

The relief valve 14 limits the maximum oil pressure in the conduit 13 and the passage 16. The relief valve 52 limits the maximum oil pressure in the hydraulic cylinder 22, in which surges of very high pressure are liable to occur, for example when the tractor is bouncing over rough ground with the implement held raised.

In a modification, the member 102 is connected by a Bowden cable to any member movable by the hydraulic power lift mechanism, for example a front mounted loader. Thus, when the pointer 129 has been turned to the normal draft control position 131 marked on the dial 130, the hydraulic power lift mechanism will effect positional control of the loader.

What we claim is:

1. A hydraulic power lift mechanism for an agricultural implement adapted to be hitched to a tractor, said hydraulic power lift mechanism comprising a pump, a hydraulic actuator connected to said pump and being operative to raise and lower said implement, a control valve for regulating the flow of oil to and from said actuator, a pair of members, the first of which is movable by variations in the height of said implement relative to said tractor and the second of which is movable by variations in the draft force exerted by the tractor on said implement, a pivotally supported balance lever operatively associated at all times to said valve and being displaceable axially of its pivot to coact with at least a selected one of said members for controlling operation of said valve by angular displacement of said balance lever about its pivot, and a hand lever operatively connected to said balance lever for controlling operation of said valve by angular displacement of said balance lever.

2. The hydraulic power lift mechanism defined in claim 1 comprising a bell-crank lever, said hand lever being pivotally connected to one arm of said bell-crank lever and said balance lever being pivotally mounted on the other arm of said bell-rank lever.

3. A hydraulic power lift mechanism for an agricultural implement adapted to be hitched to a tractor, said hydraulic power lift mechanism comprising a pump, a hydraulic actuator connected to said pump and being operative to raise and lower said implement, a series of members, the first of which is movable by variations in the height of said implement relative to said tractor, the second of which is movable by variations in the draft force exerted by said tractor on said implement, and the third of which is a fixed abutment, a pivotally supported balance lever operatively associated at all times with said valve and being displaceable axially of its pivot to coact with at least a selected one of said members for controlling operation of said valve, a relief valve operable by said balance lever when said balance lever is displaced to a position for coaction with said abutment to maintain the pressure of oil for operating said actuator at a value which is less by a predetermined amount than that required to raise said implement out of work, and a hand lever operatively connected to said balance lever for effecting control of said control valve by angular displacement of said balance lever.

4. A hydraulic power lift mechanism for an agricultural implement adapted to be hitched to a tractor, said mechanism comprising a pump, a hydraulic actuator connected to said pump and being operative to raise and lower said implement, a control valve for regulating the flow of oil to and from said actuator, a series of three members the first of which is movable by variations in the height of said implement relative to the tractor, the second of which is movable by variations in the draft force exerted by the tractor on the implement, and the third of which is a fixed abutment, a bell-crank lever, a balance lever pivotally carried by one arm of said bell-crank, said balance lever being operatively associated at all times with said control valve and being displaceable axially of its pivot to coact with at least a selected one of said members to control operation of said valve, a hand lever operatively connected to the other arm of said bell-crank lever for effecting control of said valve by angular displacement of said balance lever, and a relief valve operable by said balance lever when said balance lever is displaced to a position for coaction with said abutment to maintain the pressure of oil for operating said actuator at a value which is less by a predetermined amount than that required to raise said implement out of work.

5. A hydraulic power lift mechanism for an agricultural implement adapted to be hitched to a tractor, said mechanism comprising a pump, a hydraulic actuator connected to said pump and being operative to raise and lower said implement, a control valve for regulating the flow of oil to and from said actuator, a pair of members the first of which is movable by variations in the height of said implement relative to the tractor and the second of which is movable by variations in the draft force exerted by the tractor on the implement, a pivotally supported balance lever operatively associated at all times with said control valve and being displaceable axially of its pivot to coact with at least a selected one of said members to control flow regulating movement of said valve by angular displacement of said balance lever about its pivot, a hand lever operatively connected to said balance lever for effecting control of said valve by angular displacement of said balance lever, a sump, and two valves, each provided with an axial bleed hole, at least one of which is unbalanced hydraulically by movement of the control valve under the influence of the balance lever, one of said two valves being adapted when open to connect the pump direct to said sump and when closed to connect the pump to the hydraulic actuator and the other of said two valves being adapted when open to connect the hydraulic actuator to the sump.

6. A hydraulic power lift mechanism for an agricultural implement adapted to be hitched to a tractor, said mechanism comprising a pump, a hydraulic actuator connected to said pump and being operative to raise and lower said implement, a control valve for regulating the flow of oil to and from said actuator, a series of three members the first of which is movable by variations in the height of said implement relative to the tractor, the second of which is movable by variations in the draft force exerted by said tractor on said implement and the third of which is a fixed abutment, a pivotally supported balance lever operatively associated at all times with said control valve and being displaceable axially of its pivot to coact with at least a selected one of said members to control flow regulating movement of said valve, a relief valve operable by the balance lever when said balance lever is displaced to coact with said abutment to maintain the pressure of oil for operating said actuator at a value which is less by a predetermined amount than that required to raise the implement out of work, a sump, and two valves, each provided with an axial bleed hole, at least one of said two valves being unbalanced hydraulically by movement of the control valve under the influence of the balance lever, one of said two valves being adapted when open to connect the pump direct to said sump and when closed to connect the pump to the hydraulic actuator, and the other of said two valves being adapted when open to connect the hydraulic actuator to the sump, and a hand lever operatively connected to said balance lever for controlling operation of said valve by angular displacement of said balance lever.

7. A hydraulic power lift mechanism for an agricultural implement adapted to be hitched to a tractor, said mechanism comprising a pump, a hydraulic actuator connected to said pump and being operative to raise and lower said implement, a control valve for regulating the flow of oil to and from said actuator, a series of three members the first of which is movable by variations in the height of said implement relative to the tractor, the second of which is movable by variations in the draft force exerted by the tractor on said implement, and the third of which is a fixed abutment, a bell-crank lever, a balance lever pivotally supported on one arm of said bell-crank lever, said balance lever being operatively associated at all times with said valve and being displaceable axially of its pivot to coact with at least a selected one of said members to control flow regulating movement of said valve, a hand lever operatively connected to the other arm of said bell-crank lever to effect control of said valve by angular displacement of said balance lever, a relief valve, operable by the balance lever when said lever is positioned to coact with said abutment, to maintain the pressure of oil for operating said actuator predeterminedly less than that required to raise the implement out of work, a sump, and two valves, each provided with an axial bleed hole, at least one of which is unbalanced hydraulically by movement of the control valve under the influence of the balance lever, one of said two valves being adapted when open to connect the pump direct to said sump and when closed to connect the pump to the hydraulic actuator and the other of said two valves being adapted when open to connect the hydraulic actuator to the sump.

8. The hydraulic power lift mechanism defined in claim 5, wherein said one valve has a cut-off portion adjacent which there are provided axial grooves of varying cross-sectional area.

9. The hydraulic power lift mechanism defined in claim 5, wherein said one valve is a composite valve containing a flow control valve which controls the flow through the axial bleed hole of said one valve.

10. The hydraulic power lift mechanism defined in claim 9 wherein a manually adjustable flow control valve is provided in a hydraulic circuit between said hydraulic actuator and said sump.

11. The hydraulic power lift mechanism defined in claim 1 comprising a first shaft, means rotatably mounting said first shaft, a manully manipulatable lever member for rotating said first shaft, a crank pin mounted on said first shaft, a second shaft mounted for axial displacement along an axis parallel to the pivot axis of said balance lever, a pair of spaced lugs mounted on said second shaft and being engageable by said pin upon rotation of said first shaft to impart axial displacement to said second shaft, and a fork mounted on said second shaft and adapted to engage opposite sides of said balance lever by axial displacement of said second shaft in opposite directions.

12. A hydraulic power lift mechanism for an agricultural implement adapted to be hitched to a tractor, said mechanism comprising a pump, a hydraulic actuator connected to said pump and being operative to raise and lower said implement, a control valve for regulating the flow of oil to and from said actuator, a series of three members the first of which is movable by variations in the height of said implement relative to the tractor, the second of which is movable by variations in the draft force exerted by the tractor on the implement, and the third of which is a fixed abutment, a pivoted balance lever operatively associated at all times with said control valve and being displaceable axially of its pivot to coact with at least a selected one of said members for controlling operation of said valve, a hand lever operatively connected to said balance lever for effecting control of said valve by angular displacement of said balance lever, and a relief valve operable by the balance lever when said balance lever is positioned to coact with said abutment to maintain the pressure of oil for operating said actuator predeterminedly less than that required to raise the implement out of work.

13. A hydraulic lift mechanism for an agricultural implement adapted to be hitched to a tractor, said hydraulic lift mechanism comprising a pump, a hydraulic circuit, a hydraulic actuator connected by said circuit to said pump and being operative to raise and lower said implement, valve means contained in said circuit for controlling flow of hydraulic fluid to and from said actuator, a pivotally mounted lever, means for manually displacing said lever in a path extending axially of its pivot between spaced apart control positions, and first and second means, said lever being (a) displaceable by said first means in one of said positions to control operation of said valve means in accordance with variations in the height of said implement relative to said tractor and (b) displaceable by said second means in another of said positions to control operation of said valve means in accordance with variations in the draft force exerted by said tractor on said implement, the valve controlling displacement of said lever at each of said positions being in planes extending transversely of said path.

References Cited by the Examiner

UNITED STATES PATENTS

| | | | |
|---|---|---|---|
| 2,851,938 | 9/1958 | Giertz et al. | 172—8 |
| 3,083,777 | 4/1963 | Maughan | 172—9 |
| 3,172,479 | 3/1965 | Ashfield et al. | 172—7 |

FOREIGN PATENTS

| | | |
|---|---|---|
| 1,248,974 | 11/1960 | France. |

ABRAHAM G. STONE, *Primary Examiner.*

R. L. HOLLISTER, *Assistant Examiner.*